(12) United States Patent
Noda

(10) Patent No.: US 6,724,717 B2
(45) Date of Patent: Apr. 20, 2004

(54) OPTICAL RECORDING DISC

(75) Inventor: Eiji Noda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/002,233

(22) Filed: Nov. 15, 2001

(65) Prior Publication Data

US 2002/0085485 A1 Jul. 4, 2002

(30) Foreign Application Priority Data

Nov. 15, 2000 (JP) ........................................ 2000-348561

(51) Int. Cl.⁷ .................................................. G11B 3/70
(52) U.S. Cl. ..................................................... 369/277
(58) Field of Search ..................... 369/277, 275.1–275.8

(56) References Cited

U.S. PATENT DOCUMENTS

| | | | |
|---|---|---|---|
| 5,161,150 A | 11/1992 | Namba et al. | 369/275.4 |
| 5,204,852 A | 4/1993 | Nakagawa et al. | 369/275.1 |
| 5,325,353 A | 6/1994 | Sasaki et al. | 369/275.2 |
| 5,353,277 A | 10/1994 | Yasuda et al. | 369/275.4 |
| 5,426,632 A | 6/1995 | Murakami et al. | 369/275.4 |
| 5,441,848 A | 8/1995 | Aoi et al. | 430/269 |
| 5,500,850 A | 3/1996 | Van et al. | 369/275.4 |
| 5,696,758 A * | 12/1997 | Yanagimachi et al. | 369/275.4 |
| 5,798,987 A | 8/1998 | Ogawa | 369/13 |
| 5,856,967 A | 1/1999 | Mamin et al. | 369/126 |
| 6,219,330 B1 | 4/2001 | Ahn et al. | 369/275.1 |
| 6,246,656 B1 | 6/2001 | Kawakubo et al. | 369/112 |
| 6,307,824 B1 | 10/2001 | Kuroda et al. | 369/53.11 |

FOREIGN PATENT DOCUMENTS

| JP | 01149240 A | * | 6/1989 |
|---|---|---|---|
| JP | 04134738 A | * | 5/1992 |
| JP | 09138977 A | * | 5/1997 |

* cited by examiner

Primary Examiner—Allen Cao
(74) Attorney, Agent, or Firm—Cooper & Dunham LLP

(57) ABSTRACT

An optical disc including a substrate having a top surface provided with a ROM area and a RAM area, and a recording layer provided on the substrate. The ROM area is provided with pre-grooves each having a bottom surface and wherein the RAM area is provided with pre-grooves. The ROM area also has pre-pits formed on the bottom surface of the pre-grooves thereof.

5 Claims, 5 Drawing Sheets

OPTICAL RECORDING DISC

BACKGROUND OF THE INVENTION

This invention relates to an optical recording medium capable of recording and reproducing information with laser beams, more specifically to an optical disc having a substrate provided with a read-only (ROM) area in which pre-pits are formed and a recordable (RAM) area in which pre-grooves are formed.

The compact disc (CD) has become the standard for high-speed, high-capacity Read Only Memory (ROM). In addition, there are also recordable (CD-R) and rewritable (CD-RW) CD technologies available. Advances in CD technology have increased both the speed of data transfer and the amount of data which a single CD can hold. Progress has been made in data transfer speed by spinning the disc faster during read and by more densely packing data in a two-dimensional space. Packing data more densely has also resulted in increased data storage capacity.

A substrate having a tope surface provided with concentric or spiral pre-grooves (guide grooves) and pre-pits may be prepared by a method including a series of steps of subjecting a photoresist layer formed on a glass to light exposure (laser cutting), developing and etching the resist layer, depositing and plating Ni to obtain a stamper, and then duplicating an information pattern for an optical disc from the stamper to a transparent plastic substrate by using a UV curable resin to prepare a replicated transparent substrate of an optical disc.

To obtain good tracking servo signal characteristics, the depth of guide grooves is usually set to be around $\lambda/8$ to $\lambda/4$ (wherein $\lambda$ is a wavelength of reproducing light). In contrast, because information such as track addresses, sector addresses or the like are formed into a pit-shape on the disc, the depth of each pit is set to be around $\lambda/4$ to $\lambda/2$. In this way, the depth of guide grooves is different from the depth of the pits.

An optical recording medium having a substrate provided with a read-only (ROM) area in which pre-pits are formed and a recordable (RAM) area in which pre-grooves, the depth of pre-grooves in the RAM area is different from the depth of the pre-pits in the ROM area. Further, the spacer portion between each adjacent pre-pits of the ROM area which portion is flush with top surface of the substrate differs in height from the pre-grooves in the RAM area. The known optical disc has a problem, because recording and reproducing cannot be performed in a stable manner especially when designed as a dense and large capacity optical disc.

SUMMARY OF THE INVENTION

It is an object of the present invention to provide an optical disc which has a minimized variation in tracking signals between the ROM area and in the RAM area and capable of stably performing the recording and reproducing of the information even when the disc is designed as a dense and large capacity optical disc.

Another object of the present invention is to provide an optical disc capable of keeping the physical continuousness of the ROM and RAM areas.

In accomplishing the foregoing objects, the present invention provides an optical disc comprising a substrate having a top surface provided with a ROM area and a RAM area, and a recording layer provided on said substrate, wherein said ROM area is provided with pre-grooves each having a bottom surface, wherein said ROM area has pre-pits formed on the bottom surface of said pre-grooves thereof, and wherein said RAM area is provided with pre-grooves.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Description will be first made of a general structure of an optical recording medium according to the present invention.

Figure 5:
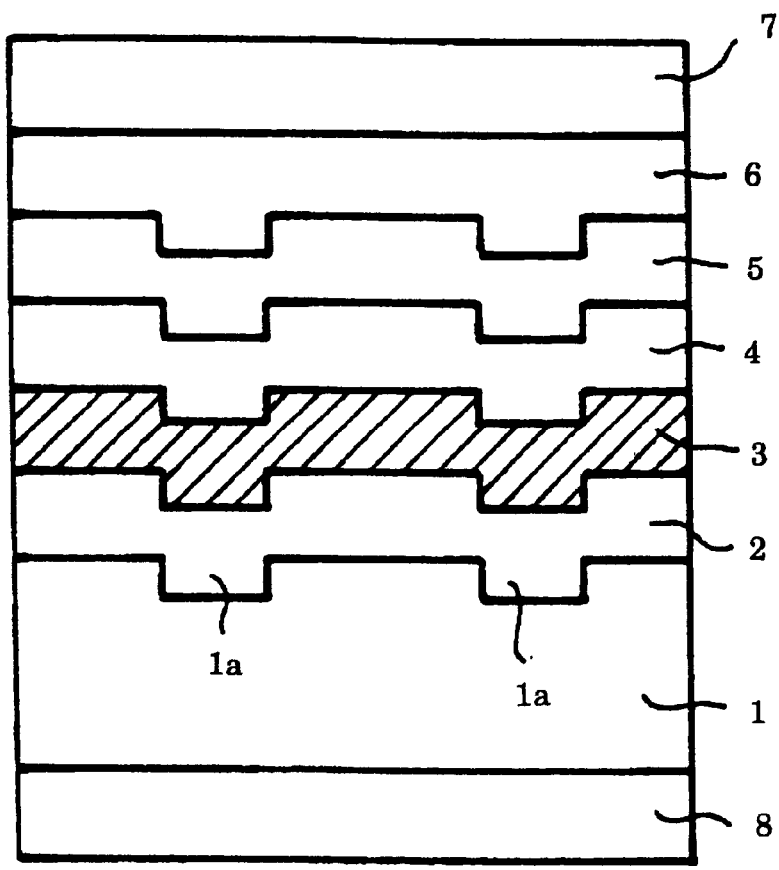
FIG. 5 is a cross-sectional view schematically illustrating a layer construction of a phase-change optical recording medium of the present invention.

FIG. 5 depicts an example of a phase-change optical recording medium. Designated as 1 is a substrate 1 with guide grooves 1a on which a first dielectric layer 2, a recording layer 3, a second dielectric layer 4, a light reflection and heat dissipation layer 5 and an overcoat layer 6 are successively overlaid. Further, as shown in FIG. 5, a printing layer 7 may be provided on the overcoat layer 6, and a hard coat layer 8 may be provided on the opposite side of the substrate 1 from the first dielectric layer 2.

As the material for the substrate 1, glass, a ceramic material or a resin may be used. The use of a resin substrate is advantageous from the standpoint of manufacturing costs and moldability. Illustrative of suitable resins for the substrate 1 are polycarbonate resins, acrylic resins, epoxy resins, polystyrene resins, acrylonitrile-styrene copolymer resins, polypropylene resins, silicone resins, fluoroplastics, ABS resins and urethane resins. Of these resins, polycarbonate resins and acrylic resins are preferably employed because of their easy processing properties, optical properties and the manufacturing costs. The substrate 1 may be prepared in the form of a disc, card or sheet.

When the phase-change optical recording medium is applied to a rewritable compact disc (CD-RW), it is desirable that the substrate 1 have a guide groove with a width of 0.25 to 0.80 μm and a depth of 250 to 650 Å.

As the phase-change recording material for the recording layer 3, a material of a quaternary system of Ag—In—Sb—Te is preferable, since the optical recording medium can exhibit high recording sensitivity and high erasability as well as stability and life of signals. To obtain a recrystallization linear speed of 5.0–10.0 m/s, the atomic percentages α (Ag), β (In), γ (Sb) and δ (Te) of the Ag—In—Sb—Te quaternary system preferably meet with the following conditions:

$0 < \alpha \leq 10$ $2 \leq \beta \leq 12$ $55 \leq \gamma \leq 70$ $22 \leq \delta \leq 32$ $\alpha + \beta + \gamma + \delta + \in = 100$.

When α (Ag), β (In) and γ (Sb) exceed 10, 12 and 70 atomic %, respectively, the stability of signal reproduction and the life of signals are not statisfactory. The content of Te has a great influence upon the recrystallization linear speed and is desired to fall in the above range.

The stability of signal reproduction and the life of signals may be improved by incorporating at least one of the elements selected from 3B, 4B and 5B of the Periodic Table. Among those elements, the use of B, C, N, Si, Ge or Sn in an amount of not more than 5 atomic % is preferred. The recording layer generally has 10–50 nm, preferably 12–30 nm. When the thickness of the recording layer is less than 10 nm, the light absorbing performance of the recording layer tends to be decreased, while when the thickness is more than 50 nm, there is a tendency that uniform phase change is difficult to be carried out at high speed in the recording layer. When initial properties such as jitter value, overwriting properties and mass production efficiency are taken into consideration, it is preferable that the thickness of the recording layer be in the range of 14 to 25 nm.

The recording layer 3 can be formed by vacuum deposition, sputtering, plasma chemical vapor deposition, photochemical vapor deposition, ion plating or electron beam deposition method. Of these methods, the sputtering method is advantageous in terms of productivity and the film quality of the recording layer obtained.

The first and second dielectric layers 2 and 4 function as protective layers. Specific examples of the material for use in the first and second dielectric layers 2 and 4 are metallic oxides such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; carbon with a diamond structure; and mixtures thereof. Further, those dielectric layers may further comprise an impurity when necessary, or each dielectric layer may be of a multiple-layered structure, provided that the melting points of the first and second dielectric layers 2 and 4 are required to be higher than that of the recording layer 3.

The first and second dielectric layers 2 and 4 for use in the present invention can be formed by vacuum deposition, sputtering, plasma chemical vapor deposition, photochemical vapor deposition, ion plating or electron beam deposition method. Of these methods, the sputtering method is the most advantageous over other methods in terms of the productivity and the film quality of the obtained layers.

The thickness of the first dielectric layer 2 has a significant effect on a groove reflectance of the light having a wavelength of 650 nm, which is for reproducing signals recorded in the DVD. For the purpose of obtaining a groove reflectance of 0.15 to 0.25 which is standardized for CD-RW using a reproduction beam with wavelengths of 780 nm and 650 nm, the thickness of the first dielectric layer 2 is desired to be 65 to 130 nm.

It is preferable that the thickness of the second dielectric layer 4 be in the range of 15 to 45 nm, more preferably in the range of 20 to 40 nm. When the thickness of the second dielectric layer 4 is less than 15 nm, the second dielectric layer 4 does not always effectively work as a heat-resistant protective layer, and the recording sensitivity of the recording medium tends to be lowered, while when the thickness of the second dielectric layer 4 is more than 45 nm, the second dielectric layer 4 tends to be delaminated when used at a so-called low linear speed and, accordingly, the recording repetition performance tends to be lowered.

Specific examples of the material for the light reflection and heat dissipation layer 5 are metals such as Al, Au, Ag, Cu and Ta, and alloys thereof. The light reflection and heat dissipation layer 5 may further comprise other additional elements such as Cr, Ti, Si, Cu, Ag, Pd and Ta. The light reflection and heat dissipation layer 5 can be provided by vacuum deposition, sputtering, plasma chemical vapor deposition, photochemical vapor deposition, ion-plating or electron beam deposition method. It is preferable that the thickness of the light reflection and heat dissipation layer 5 be in the range of 70 to 200 nm, more preferably in the range of 100 to 160 nm.

It is also preferable that an overcoat layer 6 be provided on the light reflection and heat dissipation layer 5 for preventing oxidation of the light reflection and heat dissipation layer 5. As the overcoat layer 6, an ultraviolet-curing resin layer which is prepared by spin coating is in general use. The thickness of the overcoat layer 6 is generally in the range of 5 to 15 μm. When the thickness is less than 5 μm, operation errors tend to occur increasingly when a printing layer 7 is overlaid on the overcoat layer 6, while when the thickness is more than 15 μm, the internal stress of the overcoat layer 6 increases, so that the overcoat layer 6 tends to have large adverse effects on the mechanical properties of the recording medium.

A hard coat layer 8 may be provided on the non-grooved side of the substrate 1. The hard coat layer 8 is generally formed by subjecting a UV-curing resin to spin coating. It is preferable that the thickness of the hard coat layer 8 be in the range of 2 to 6 μm. When the thickness of the hard coat layer 8 is less than 2 μm, the scratch resistance thereof tends to be lowered, while when the thickness of the hard coat layer 8 is more than 6 μm, the internal stress of the hard coat layer 8 increases, so that the hard coat layer 8 tends to have large adverse effects on the mechanical properties of the recording medium. It is preferable that the hard coat layer 8 have a pencil hardness of H or more with which pencil hardness, the surface of the hard coat layer 8 is seriously scratched even when rubbed with a cloth. When necessary, an electroconductive material may be contained in the hard coat layer 8 to make the hard coat layer 8 antistatic so as to effectively prevent dirt or the like from electrostatically adhering thereto.

The above description has been made of a phase-change type optical recording medium which utilizes a reversible change between a crystal phase and an amorphous phase or between a crystal phase and another crystal phase. Such a phase-change type optical recording medium is an information recordable, reproducible and rewritable medium (CD-RW). More particularly, information can be overwritten onto the phase-change type optical recording medium by a single light beam, and the medium can be driven by a simple optical drive system. The present invention, however, is also embodied as a write-once type optical recording media (CD-R) in which recording is performed by making holes with a laser beam in an organic dye layer or an inorganic layer. A phthalocyanine dye is a suitable example of the organic dye.

Figure 1A:
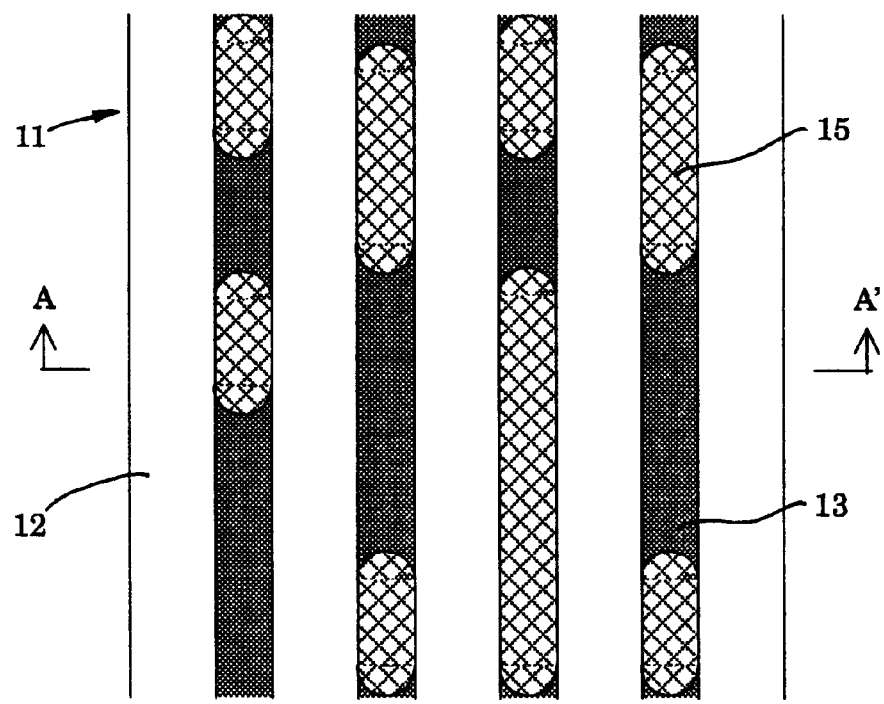
FIG. 1(a) is a plan view schematically illustrating the disposition of pre-pits in a ROM area on a substrate of an optical disc according to the present invention.
Figure 1B:
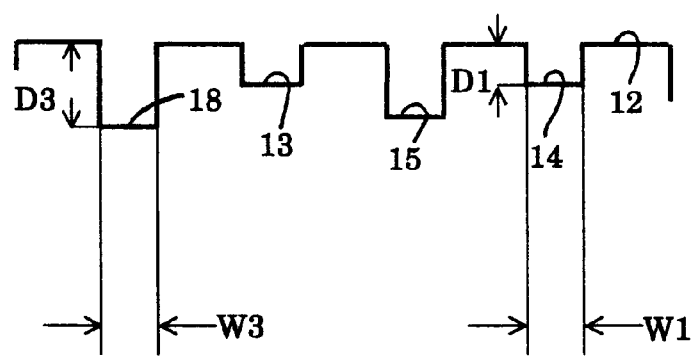
FIG. 1(b) is a sectional view taken alone A–A' in FIG. 1(a)
Figure 2A:
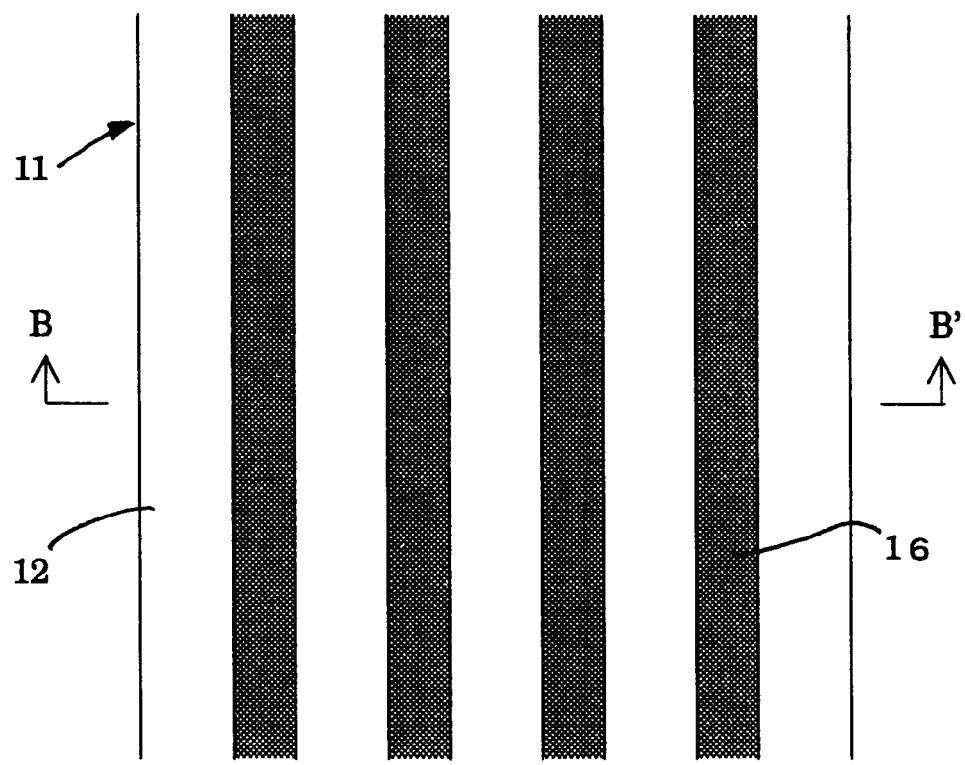
FIG. 2(a) is a plan view schematically illustrating the disposition of pre-grooves in a RAM area on the substrate of FIG. 1(a)
Figure 2B:
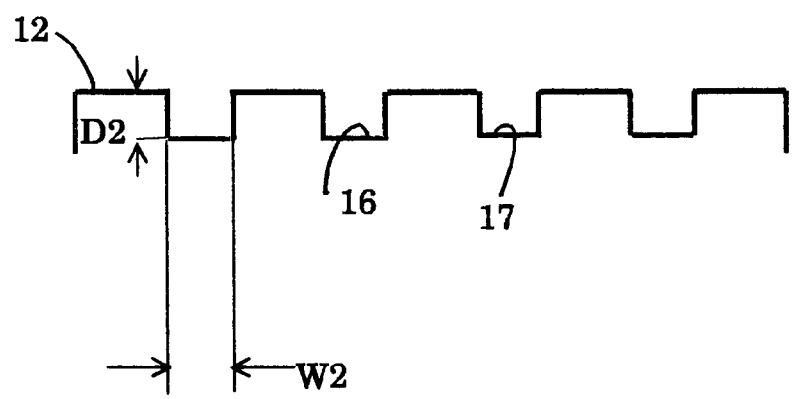
FIG. 2(b) is a sectional view taken alone B–B' in FIG. 2(a)
Figure 3A:
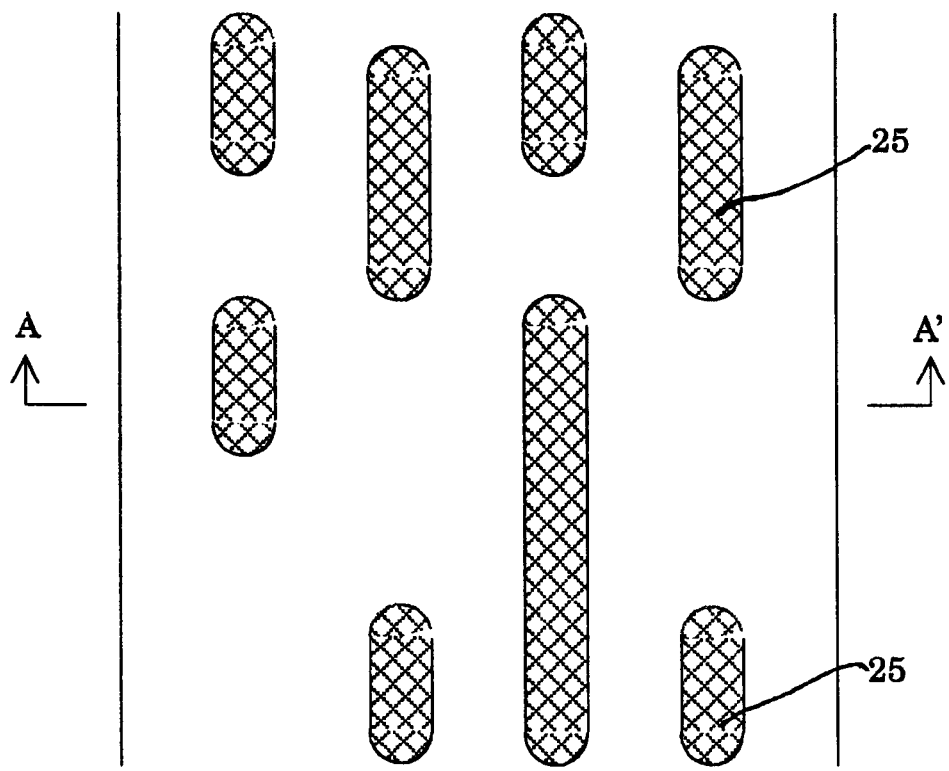
FIG. 3(a) is a plan view schematically illustrating the disposition of pre-grooves in a ROM area on a substrate of a known optical disc.
Figure 3B:
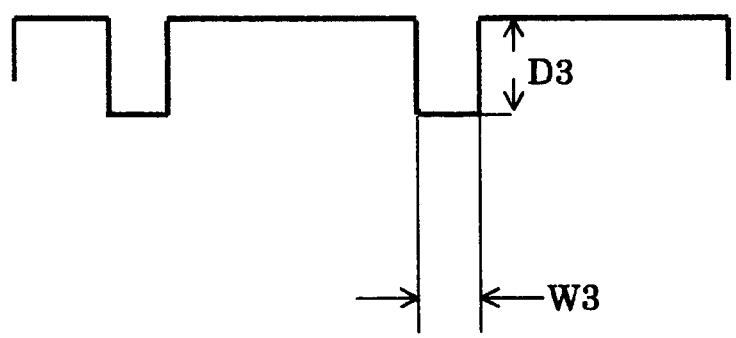
FIG. 3(b) is a sectional view taken alone A–A' in FIG. 3(a)
Figure 4A:
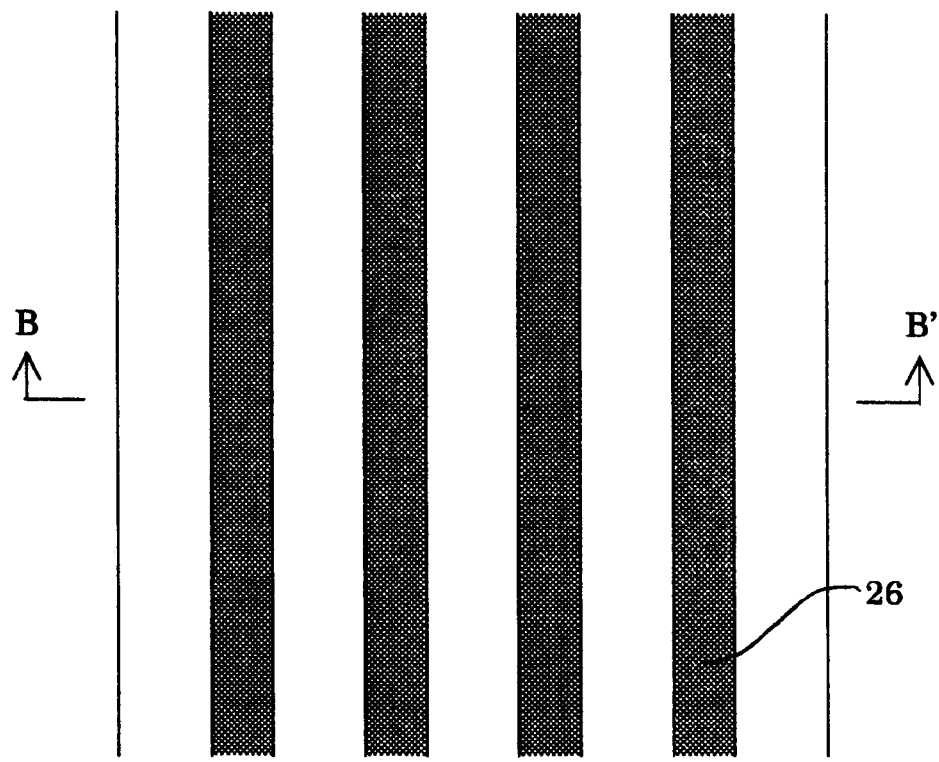
FIG. 4(a) is a plan view schematically illustrating the disposition of pre-grooves in a RAM area on the substrate of FIG. 3(a)
Figure 4B:
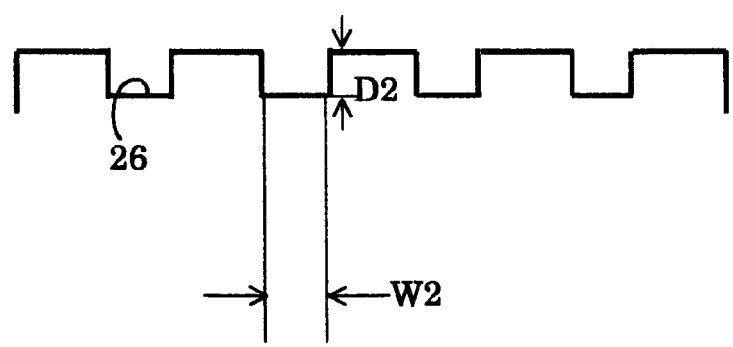
FIG. 4(b) is a sectional view taken alone B–B' in FIG. 4(a)

Referring now to FIGS. 1(a), 1(b), 2(a) and 2(b), the optical disc of the present invention comprises a substrate 11 having a top surface 12 provided with a ROM area as shown in FIGS. 1(a) and 1(b) and a RAM area as shown in FIGS. 2(a) and 2(b). The ROM area is provided with pre-grooves 13 each having a bottom surface 14. The ROM area has pre-pits 15 formed on the bottom surface 14 of the pre-grooves 13. On the other hand, the RAM area is provided with pre-grooves 16.

Because the ROM area is provided with pre-grooves 13, variation in tracking signals between the ROM area and the RAM area is reduced, the recording and reproduction of information by laser beams can be carried out in a stable manner.

It is preferred that the pre-grooves 13 of the ROM area and the pre-grooves 16 of the RAM area have the same width and depth for reasons of minimization of variation in tracking signals or reflectance (Rtop) between the ROM area and the RAM area. Namely, the pre-grooves 13 of the ROM area and the pre-grooves 16 of the RAM area preferably have the following conditions:

W1=W2 and
D1=D2 in which
W1: a width of the pre-groove 13 of the ROM area;
W2: a width of the pre-groove 16 of the RAM area;
D1: a depth defined by the bottom surface 14 of the pre-groove 13 of the ROM area and the top surface 12;
D2: a depth defined by the bottom surface 17 of the pre-groove 16 of the RAM area and the top surface 12.

The preferred sizes of the pre-grooves 13 and 16 and the pre-pits 15 in the case of CD-RW having a recording layer made of a phase-change recording material are as follows:
W1: 0.25–0.80 μm
D1: 250–650 Å
W3: 0.25–0.80 μm
D3: 650–1,300 Å
W2: 0.25–0.80 μm
D2: 250–650 Å
wherein W1, W2, D1 and D2 are as defined above, W3 is a width of the pre-pits 15 of the ROM area and D3 is a depth, defined by a bottom surface 18 of the pre-pit 15 and the top surface 12, of the RAM area.

The preferred sizes of the pre-grooves 13 and 16 and the pre-pits 15 in the case of CD-R having a recording layer made of an organic dye recording material are as follows:
W1: 0.25–0.80 μm
D1: 700–2,000 Å
W3: 0.25–0.80 μm
D3: 1,500–4,000 Å
W2: 0.25–0.80 μm
D2: 700–2,000 Å
wherein W1, W2, W3 D1, D2 and D3 are as defined above.

The above-defined sizes of the pre-grooves and pre-pits are desirable to obtain satisfactory degree of modulation and reflection and to obtain distortion-free rewriting signals.

The substrate of the optical disc of the present invention may be prepared by any suitable known method. For example, by exposing a resist layer with light with a low intensity, the grooves may be formed. By the succeeding exposure with a higher intensity light, the pits may be formed. In this case, it is preferred that the resist layer be composed of a relatively low light sensitive photoresist layer and a relatively high light sensitive photoresist layer provided thereon. By exposing the resist layer with light with a low intensity, the upper, high sensitive layer may selectively undergo the photoreaction to form grooves. By the succeeding exposure with a higher intensity light, the lower, low sensitive layer may undergo the photoreaction to form pits. The irradiation with the high and low intensity light may be conducted separately or simultaneously.

The following comparative example and example will further illustrate the present invention.

COMPARATIVE EXAMPLE

A polycarbonate resin substrate provided with ROM and RAM areas as shown in FIGS. 3(a), 3(b), 4(a) and 4(b) were prepared by a stamper. The top surface of the space between adjacent two pre-pits 25 of the ROM area was flush with the top of the substrate (land) thereof. The width and depth of the pre-pits 25 and the pre-grooves 26 were as shown in Table 1. Using the substrate, an optical disc (CD-RW) having a construction as shown in FIG. 5 was prepared. A ZnS—SiO$_2$ was used as upper and lower dielectric layers, AgInSbTe was used as a phase-change layer, Al—Ti was used as a reflecting layer, and a UV-curable acrylic resin was used as a overcoat layer.

EXAMPLE

A polycarbonate resin substrate provided with ROM and RAM areas as shown in FIGS. 1(a), 1(b), 2(a) and 2(b) were prepared by a stamper. The top surface of the space between adjacent two pre-pits 15 of the ROM area was flush with the bottom surface 17 of the pre-groove 16 of the RAM area. The width and depth of the pre-pits 15 and the pre-grooves 13 and 16 were as shown in Table 1. Using the substrate, an optical disc (CD-RW) having a construction as shown in FIG. 5 was prepared in the same manner as that in Comparative Example.

An EFM signal was recorded in the RAM area of each of the optical discs of the above Comparative Example and Example. After recording, signals in the ROM area and the RAM area after recording were compared. The results (reflectance of the EFM signals) are shown in Table 1.

TABLE 1

|  | Comparative Example | Example |
| --- | --- | --- |
| Width (W1) of pre-groove of ROM area (μm) | — | 0.50 |
| Depth (D1) of pre-groove of ROM area (Å) | — | 400 |
| Width (W3) of pre-pit of ROM area (μm) | 0.50 | 0.50 |
| Depth (D3) of pre-pit of ROM area (Å) | 1400 | 900 |
| Width (W2) of pre-groove of RAM area (μm) | 0.50 | 0.50 |
| Depth (D2) of pre-groove of RAM area (Å) | 400 | 400 |
| Reflectance (%) at ROM area | 27 | 21 |
| Reflectance (%) at RAM area | 21 | 21 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An optical disc comprising a substrate having a top surface provided with a ROM area and a RAM area, and a recording layer provided on said substrate, wherein said ROM area is provided with pre-grooves each having a bottom surface, said ROM area has pre-pits formed on the bottom surface of said pre-grooves thereof, and said RAM area is provided with pre-grooves.

2. An optical disc as claimed in claim 1, wherein said ROM area has portions in which pre-grooves having no pre-pits are formed, and wherein said pre-grooves of said ROM area having no pre-pits have a first width and a first depth defined by the bottom surface of each pre-groove of said ROM area and said top surface, wherein said pre-grooves of said RAM area have a second width and a second depth defined by the bottom surface of each pre-groove of said RAM area and said top surface, and wherein the first width and the first depth are equal to the second width and the second depth, respectively.

3. An optical disc as claimed in claim 2, wherein said recording layer is made of a phase-change recording mater, wherein said first and second widths are each 0.25–0.80 $\mu$m and said first and second depths are each 250–650 Å, and wherein said pre-pits of said ROM area have a pit width of 0.25–0.80 $\mu$m and a pit depth, defined by a bottom surface of each pre-pit and said top surface, of 650–1,300 Å.

4. An optical disc as claimed in claim 2, wherein said recording layer is made of an organic dye recording material, wherein said first and second widths are each 0.25–0.80 $\mu$m and said first and second depths are each 700–2,000 Å, and wherein said pre-pits of said ROM area have a pit width of 0.25–0.80 $\mu$m and a pit depth, defined by a bottom surface of each pre-pit and said top surface, of 1,500–4,000 Å.

5. An optical disc comprising:

a substrate;

a recording layer provided on said substrate and including a ROM area and a RAM area;

pre-grooves each having a bottom surface, provided in said ROM area and in said RAM area; and pre-pits formed on the bottom surface of said pre-grooves in said ROM area.

* * * * *